Jan. 11, 1938.   C. MACKINTOSH   2,104,930
PLANT DUSTING MACHINE
Filed March 15, 1935   2 Sheets-Sheet 2
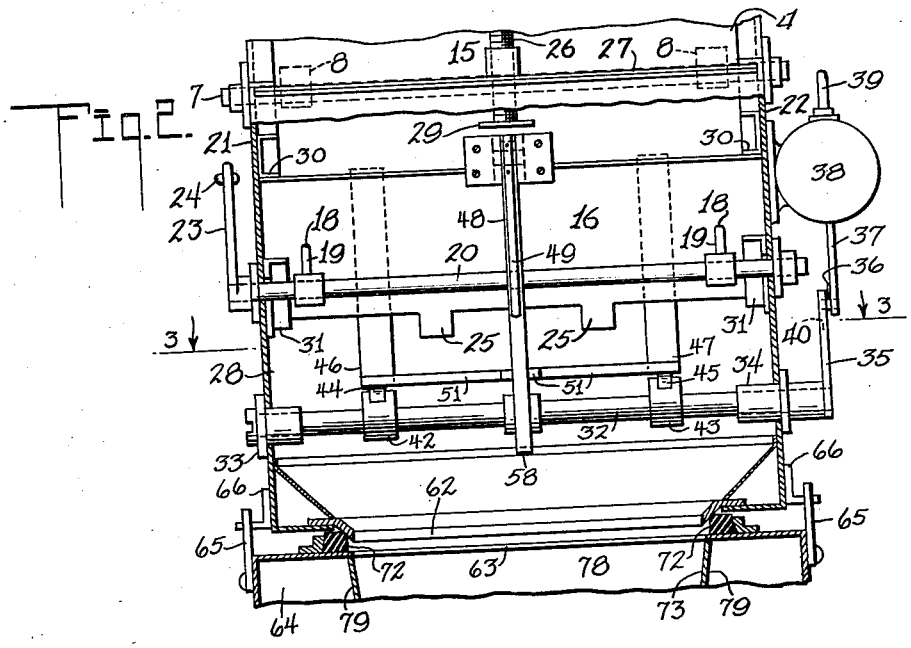
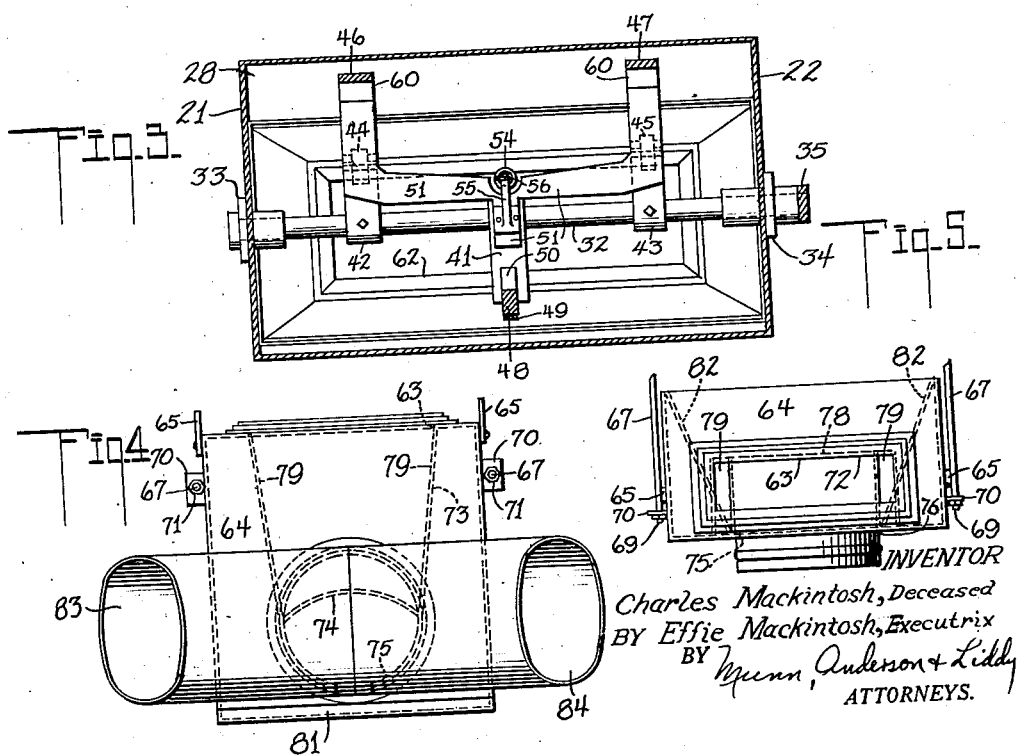
INVENTOR
Charles Mackintosh, Deceased
BY Effie Mackintosh, Executrix
BY Munn, Anderson & Liddy
ATTORNEYS.

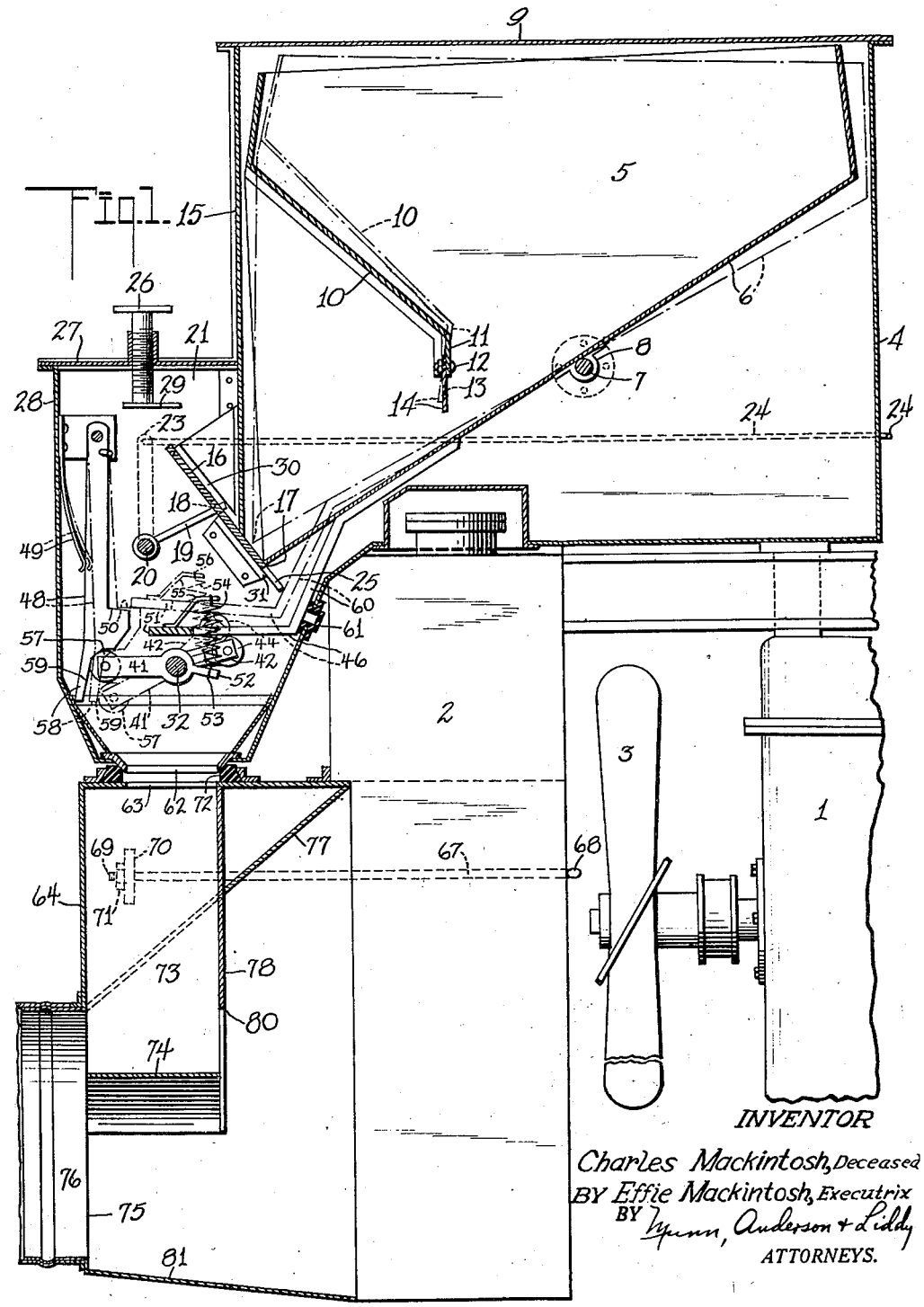

Patented Jan. 11, 1938

2,104,930

UNITED STATES PATENT OFFICE 2,104,930

PLANT DUSTING MACHINE

Charles Mackintosh, deceased, late of Ukiah, Calif., by Effie Mackintosh, executrix, Ukiah, Calif., assignor of one-half to Frank A. McDonald, San Francisco, Calif.

Application March 15, 1935, Serial No. 11,328

10 Claims. (Cl. 221—118)

The invention relates to improvements in plant dusting machines, and it consists of the combinations, constructions and arrangements hereinafter described and claimed.

An object of the invention is to provide an improvement over the form of the device shown in the application of Charles Mackintosh, Serial No. 604,522, filed April 11, 1932 that has become Patent No. 2,014,392, issued September 17, 1935. In the patent there is shown a plant dusting device especially designed for the use of sulphur, and the sulphur is fed into a position in front of the radiator of a tractor, and the fan of the tractor is reversed so as to blow air through the radiator, and this air will convey the sulphur to the plants. The air not only conveys the sulphur but since the air is heated, it will cause the sulphur to fume. It is the fuming of the sulphur which kills the parasites on the vines.

In the present form of the invention there is provided a balanced hopper for the sulphur, and this hopper is rocked so as to keep the sulphur in a fluffy condition. In order to prevent the sulphur from bridging, the hopper is slowly rocked in one direction, and then speedily moved in the opposite direction, this latter movement being brought to an abrupt stop. This results in a jarring action and loosens the sulphur and prevents any bridging effects. The sulphur is therefore uniformly fed from the hopper into a position in front of the air flowing from the fan.

If sulphur is agitated too severely it will explode, causing damage. On the other hand, if stirring means is placed in a stationary hopper, it will merely form paths in the sulphur, and the sulphur will bridge around the means. The only way to properly handle the sulphur to keep it in a loosened condition, and at the same time to prevent any accidental explosion is to rock the hopper in the manner above indicated.

The sulphur is dropped vertically into a position in front of the outlet pipe, and a baffle is disposed midway between the top and bottom of the outlet pipe for arresting the fall of the sulphur. The air from the fan will sweep the sulphur off from the baffle, and carry it through the outlet pipes or conduits. The casing carrying the baffle and the outlet conduit has inclined partitions for guiding all of the air toward the entrance opening of the conduit.

Other objects and advantages will appear in the following specification, and the novel features of the device will be particularly pointed out in the appended claims.

The invention is illustrated in the accompanying drawings forming a part of this application, in which Figure 1 is a vertical section through the entire device showing it operatively applied to a tractor;

Figure 2 is a front view of the device showing the front walls removed;

Figure 3 is a section along the line 3—3 of Figure 2;

Figure 4 is a front elevation of the casing disposed in front of the radiator; and Figure 5 is a top plan view of Figure 4.

In carrying out the invention, a tractor is shown in Figure 1 and includes an engine 1, a radiator 2, and a fan 3. As in the pending application, the fan 3 is reversed so that the air is drawn from around the engine 1, and is forced through the radiator 2. This air keeps the water in the radiator cool and in turn the air is heated. It is this heated air that is used in conveying the sulphur or other dusting material to the plants. When sulphur is used the heated air is at a sufficient temperature to cause the sulphur to fume before it strikes the plants, and the fuming sulphur will effectively kill parasites on the vines or plants.

The principal improvement of the present invention over the form of the device shown in said patent lies in the rocking hopper and the particular means for moving the hopper. In Figure 1 there is shown a housing 4 in which a hopper 5 is mounted, and this hopper has an inclined bottom wall 6, which is rockably mounted on a shaft 7 by means of bearings 8. The extent of the rocking movement of the hopper 5 is shown by the broken lines, and the housing 4 is made just large enough to permit this movement to take place. A removable cover 9 may be provided for the housing if desired, and this cover is removed when the hopper is filled with the dusting material, such as sulphur.

At the front of the hopper 5 there is disposed an inclined partition 10, and this partition extends inwardly and downwardly toward the shaft 7. At the lower end of the partition a lip 11 is provided which carries screws or bolts 12 that are received in slots 13 in a control gate 14. This gate may be manually raised or lowered, and then secured in place by the bolts 12, and in this way the opening between the bottom of the gate and the wall 6 is varied as to size. A change of this opening will alter the amount of sulphur or other material flowing from the hopper 5 down into the lower end of the hopper.

The housing 4 has a front wall 15, and this wall extends downwardly to a manually controlled gate 16. Figure 1 shows the gate 16 as being inclined at an angle so that the lowermost edge 17 in the hopper will be disposed close to the gate even when the hopper is in its dotted line position. The gate 16 controls the flow of material from the hopper. Figure 2 shows the gate 16 as having openings 18 for receiving fingers 19 secured to a rocker shaft 20. Figure 2 also shows the shaft 20 as extending through the side walls 21 and 22 of the housing 4, and one end of the shaft 20 carries an arm 23. Figure 1 shows the arm 23 as being actuated by a rod 24 that extends back to the tractor. The rod 24 may be either actuated by a lever or by a foot pedal. The operator, while driving the tractor, can actuate the rod 24 for opening the gate 16 to the desired extent. Figure 2 also shows lugs 25 integral with the gate 16 and projecting below the bottom edge of the gate. These lugs act as guides for the bottom edge 17 of the hopper 5, and prevent this edge from engaging with the bottom edge of the gate 16.

The full open position of the gate 16 can be controlled by a manually adjustable screw 26, see Figure 1. This screw is threaded into the top 27 of an auxiliary housing 28 forming a part of the housing 4. The screw 26 has a bottom portion 29 that acts as a stop for the gate 16. The screw may be adjusted vertically, and this will limit the uppermost position into which the gate 16 can be manually moved by the operator. The operator can manually control the opening of the gate from this extreme open position to the closed position. The gate 16 rides between guide brackets 30 and 31.

The particular manner of rocking the hopper 5 will now be described. In the auxiliary housing 28 a horizontal shaft 32 is disposed, and Figure 2 shows this shaft as being carried by bearings 33 and 34, which in turn are supported by the side walls 21 and 22. The shaft 32 has an arm 35 connected thereto, and this arm is directly connected by means of a pin 36 to an arm 37 that depends from a standard vacuum motor 38. A conduit 39 leads from the motor 38 to the intake manifold (not shown) of the engine 1. Since the vacuum motor 38 operates in a standard manner, a description of its working parts need not be given. When the engine is started, the arm 37 depending from the motor 38 will oscillate, and this arm through the pin 36 will oscillate the arm 35. The pin 36 rides in a slot 40 in the arm 35 to permit this movement.

Referring again to Figure 1 it will be noted that the shaft 32 carries a central arm 41 which extends forwardly in the housing 28. In Figures 1 and 2 there is shown two additional arms 42 and 43 extending rearwardly from the shaft 32. The arms 42 and 43 carry rollers 44 and 45, and these rollers ride on guide rails 46 and 47. The rails 46 and 47 are connected to the bottom wall 6 of the hopper 5. It will be seen from this construction that a rocking of the shaft 32 in a counter-clockwise direction in Figure 1 will raise the arms 42 and 43 for causing the rollers 44 and 45 to lift the rails 46 and 47, and to swing the hopper 5 into the broken line position shown in Figure 1.

Means is provided for temporarily holding the hopper in this position, and this means includes a trigger 48 pressed forwardly by a leaf spring 49. This trigger has a shoulder 50 that is moved beneath a bar 51 that connects the two rails 46 an 47 together. The trigger holds the hopper against return movement during the initial swinging of the shaft 32 in a clockwise direction. This return movement will move the rollers 44 and 45 away from the rails 46 and 47, and will swing the arm 41 from the dotted line position into the full line position shown in Figure 1.

The arm 41 has a projection 52 to which the lower end 53 of a spring 54 is connected. The bar 51 has a finger 55 secured thereto, and the upper end of the spring 54 is secured to the finger 55 at 56. It will be seen that the rocking of the shaft 32 in a clockwise direction will swing the projection 52 downwardly, and this will tension the spring 54. During this tensioning of the spring the arm 41 will swing in a clockwise direction, and will move its roller 57 against a finger 58 forming a part of the trigger 48. The finger 58 has a cam edge 59 of such shape that the roller 57 will move the finger 58, and with it the trigger 48 into the full line position shown in Figure 1 when the arm 41 reaches its full line position. This movement will free the shoulder 50 of the trigger 48 from the bar 51, and the spring 54 will immediately return the hopper 5 into its full line position. This sudden return movement of the hopper 5 will cause the portions 60 of the rails 46 and 47 to strike bumpers 61 carried by the auxiliary housing 28. This will bring the hopper 5 to a sudden stop with a resulting jarring action which will loosen any bridging effect of the material in the hopper 5. It is this relatively slow moving of the hopper 5 in a clockwise direction, and the sudden moving of the hopper in the opposite direction with the abrupt stopping of the moving hopper which will prevent the sulphur or other material from bridging. This is one of the vital features of the invention.

It will also be noted that the load of the sulphur in the hopper 5 is carried by the partition 10, and not by the front wall 15 and the gate 16. The sulphur disposed between the gate 14 and the gate 16 is not heavy enough to interfere with the operation of the device. It will also be noted that the clockwise moving of the hopper 5 will move the sulphur in the lower end of the hopper toward the front wall 15, and this will have a tendency to loosen the sulphur. The moving of the hopper in the manner already described will cause it to feed from the gate 16 when the gate is opened.

This sulphur will drop through the auxiliary housing 28, and will pass through the opening 62 in the bottom of the auxiliary housing 28. The opening 62 is disposed above an opening 63 in the radiator housing 64. The housing 64 is removably secured to the auxiliary housing 28 by catches 65, see Figure 2, which are removably secured to lugs 66 carried by the walls 21 and 22. The housing 64 is clamped to the front of the radiator 2 by elongated bolts 67 that have hook-shaped ends 68 engaging with the rear of the radiator, and which have their threaded ends 69 inserted through lugs 70 carried by the housing 64, and these threaded ends 69 receive nuts 71, by means of which the housing 64 is secured to the radiator. A rubber gasket 72 is disposed between the auxiliary housing 28 and the radiator housing 64, and this provides a perfect seal between the two housings.

Within the housing there is provided a conduit 73 through which the sulphur passes and the sulphur drops down upon an arcuate baffle 74 which is disposed midway across the opening 75 of an outlet conduit 76.

In Figure 1 an inclined partition 77 is shown for directing the hot air toward the conduit 76. In Figures 1 and 4 the conduit 73 is shown as being formed by a rear partition 78 and inclined side partitions 79. The rear partition 78 has an opening 80 registering with the opening 75, and this permits the heated air to pass above the baffle 74 and to convey the sulphur into the conduit 76.

The bottom wall 81 of the housing 64 is inclined upwardly for conveying the heated air toward the conduit 76. In Figure 5 side partitions 82 are shown and are inclined for guiding the heated air toward the conduit 76. These various partitions cause all of the air passing through the radiator to be directed toward the conduit 76. This conduit has two branches 83 and 84 for directing the dusting material such as the fuming sulphur toward the plants. The branches 83 and 84 may be adjustable on the housing 64 for directing the sulphur to the desired place.

In use the operator drives the tractor in the ordinary manner, and controls the amount of sulphur thrown from the branch conduits 83 and 84 at will. The sulphur is fumed before it leaves the device, and the throwing of the sulphur is done in front of the tractor so that the operator can view the work as it progresses.

While only the preferred form of the invention is shown, it should be understood that various changes or modifications may be made within the scope of the appended claims without departing from the spirit of the invention.

What is claimed is:

1. In a device of the type described, a housing, a hopper rockably mounted therein, said housing having a fixed wall, an outlet gate disposed at the bottom of the wall, said hopper having an outlet disposed adjacent to the gate, one wall of the hopper outlet cooperating with the fixed housing wall during the rocking of the hopper to agitate the material just prior to leaving the hopper outlet, to keep it in a fluffy condition as it passes the gate.

2. In combination, a support, a rocking hopper having an inclined bottom wall with an outlet at its lower end, a gate carried by the support for controlling the flow of material from the hopper, said gate being inclined so as to be positioned near the outlet end of the hopper throughout the entire movement of the hopper, manually controlled means for opening the gate, and adjustable means for limiting the extent of movement of the gate into open position.

3. In combination, a hopper having an inclined bottom wall with an outlet at its lower edge, means for pivotally supporting the hopper, a transverse hopper wall cooperating with the bottom wall for supporting the material in the hopper in a balanced position with relation to the pivotal hopper support, an adjustable gate carried by the transverse wall for controlling the flow of material toward the outlet end of the hopper, a fixed wall positioned near the outlet end of the hopper and forming an acute angle with the bottom hopper wall, a second gate carried by the fixed wall for controlling the flow of material from the outlet end, and means for rocking the hopper for causing the lower end of the bottom wall to periodically move the material against the fixed wall for aiding in keeping the material in a fluffy condition.

4. In combination, a hopper having an inclined bottom wall with an outlet at its lower edge, means for pivotally supporting the hopper, a transverse hopper wall cooperating with the bottom wall for supporting the material in the hopper in a balanced position with relation to the pivotal hopper support, an adjustable gate carried by the transverse wall for controlling the flow of material toward the outlet end of the hopper, a fixed wall positioned near the outlet end of the hopper and forming an acute angle with the bottom hopper wall, a second gate carried by the fixed wall for controlling the flow of material from the outlet end, and means for rocking the hopper for causing the lower end of the bottom wall to periodically move the material against the fixed wall for aiding in keeping the material in a fluffy condition, said hopper rocking means also having means for quickly moving the hopper in one direction and for bringing it to an abrupt stop for jarring loose any bridging tendency of the material in the hopper.

5. In combination, a rockable hopper, a rocking shaft, means operatively connecting the shaft with the hopper for rocking the latter in one direction when the shaft is rocked in one direction, means for temporarily arresting the return movement of the hopper during the initial return rocking movement of the shaft, a spring tensioned by the return movement of the shaft, said spring being connected to the hopper, said hopper arresting means being freed after the spring is tensioned, whereby the spring will quickly return the hopper to its starting position, and stops placed in the path of swing of the hopper for bringing the hopper to an abrupt stop.

6. In combination, a rockable hopper, rails carried thereby, a rocking shaft, arms carried by the shaft and having rollers contacting with the rails for swinging the hopper in one direction when the shaft is rocked in one direction, a trigger for holding the hopper against return movement, a spring connected to the hopper and being tensioned by the return movement of the shaft, an arm carried by the shaft and having a roller for releasing the trigger when the spring is tensioned, whereby the hopper will be quickly moved on its return stroke, and stops for bringing the hopper to an abrupt stop.

7. In combination, a support, a balanced hopper rockably supported thereby and having an inclined bottom wall with an outlet at its lower end, a gate carried by the support and being positioned adjacent to the outlet end of the hopper for controlling the flow of material from the hopper as it is rocked, and manually controlled means for opening the gate.

8. In combination, a support, a balanced hopper rockably supported thereby and having an inclined bottom wall with an outlet at its lower end, a gate carried by the support and being positioned adjacent to the outlet end of the hopper for controlling the flow of material from the hopper as it is rocked, and manually controlled means for opening the gate, and means for rocking the hopper, said means quickly moving the hopper in one direction and then bringing the hopper to an abrupt stop for jarring loose any bridging tendency of the material in the hopper.

9. In a plant dusting machine, a balanced hopper, means pivotally supporting the hopper, means for rocking the hopper, means for temporarily holding the hopper against movement in one direction, a spring connecting the hopper with the hopper rocking means, said spring being tensioned by the hopper rocking means while the hopper is temporarily held against movement by the hopper holding means, means for freeing the holding means from the hopper after the hopper operating means has moved a predetermined distance, whereby the tensioned spring will quickly move the hopper, and a stop for limiting the movement of the hopper when moved by the spring, said stop bringing the hopper to an abrupt stop for agitating material in the hopper.

10. In combination, a balanced and pivoted hopper, an oscillating member for rocking said hopper in one direction when the member is moved in one direction, a spring connected between the member and hopper and being tensioned when the member is moved in the opposite direction, means for temporarily holding the hopper against movement during the tensioning of the spring and then for freeing the hopper, whereby the spring will quickly move the hopper, and a stop for bringing the hopper to an abrupt stop when moved by the spring, whereby the material in the hopper will be kept agitated.

EFFIE MACKINTOSH,
*Executrix of the Estate of Charles Mackintosh, Deceased.*